United States Patent
Mitsubori et al.

[11] Patent Number: 6,045,266
[45] Date of Patent: Apr. 4, 2000

[54] SUPERCHARGER THRUST BEARING

[75] Inventors: Ken Mitsubori, Yokohama; Yukiteru Sekita, Gyouda, both of Japan

[73] Assignee: Ishikawajima-Harima Heavy Industries Co., Ltd., Tokyo, Japan

[21] Appl. No.: 09/098,664

[22] Filed: Jun. 17, 1998

[30] Foreign Application Priority Data

Jun. 26, 1997 [JP] Japan ................... 9-170343

[51] Int. Cl.[7] .................................................. F16C 17/04
[52] U.S. Cl. ........................... 384/123; 384/121; 384/305
[58] Field of Search ................................. 384/123, 112, 384/305, 311, 307, 121

[56] References Cited

U.S. PATENT DOCUMENTS 5,433,529 7/1995 Hensel ........................... 384/124
5,770,906 6/1998 Hazelton et al. ................. 384/123

Primary Examiner—Lenard A. Footland
Attorney, Agent, or Firm—McCormick, Paulding & Huber LLP

[57] ABSTRACT

A supercharger thrust bearing for use in a machine rotatable at a high speed includes radial oil grooves formed in a pad surface. Gradients are formed at the outward radial ends of the oil supply grooves such that the groove depth sequentially diminishes as the outside in the radial direction is approached. The machine rotatable at a high speed is, for example, a boat or a ship. The lubricating oil inside the oil supply grooves is forced out by the gradients and creates a dam. The lubrication oil flowing in a circumferential direction on the pad surface, which is heated on the pad surface, is stopped by this dam and turned to a radially outward direction. The heated oil is pushed out from the pad surface and the new cold oil is caused to flow onto the pad surface from the radial grooves.

20 Claims, 3 Drawing Sheets

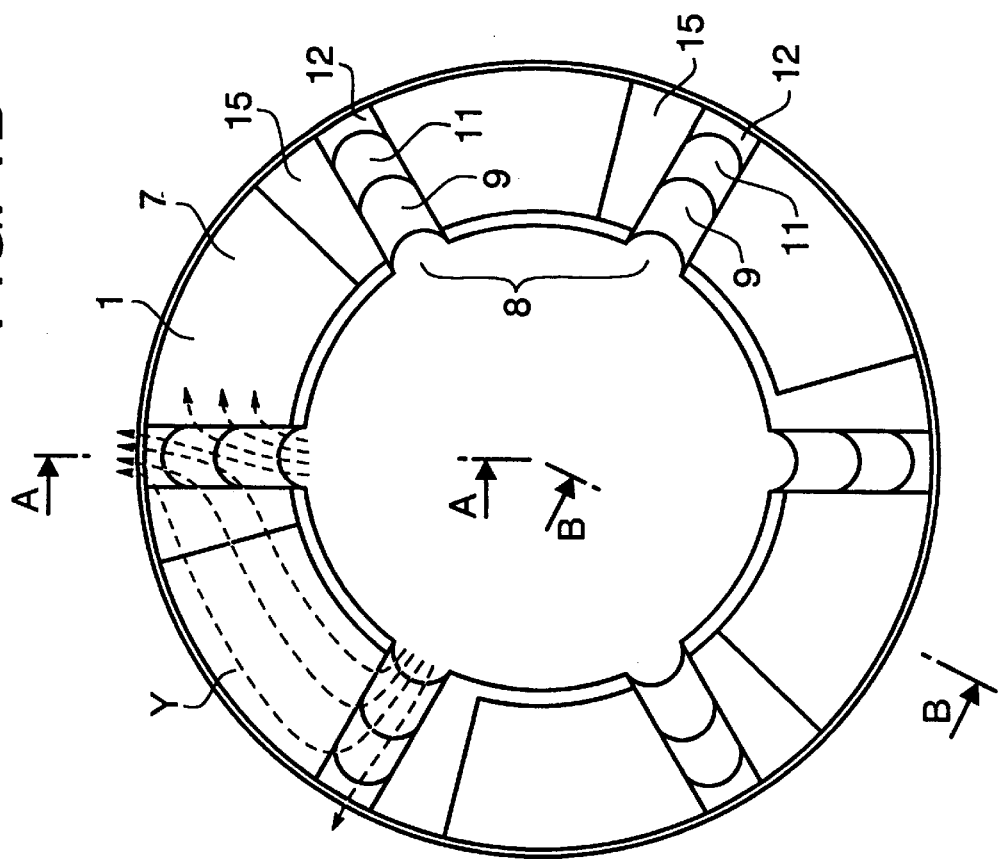
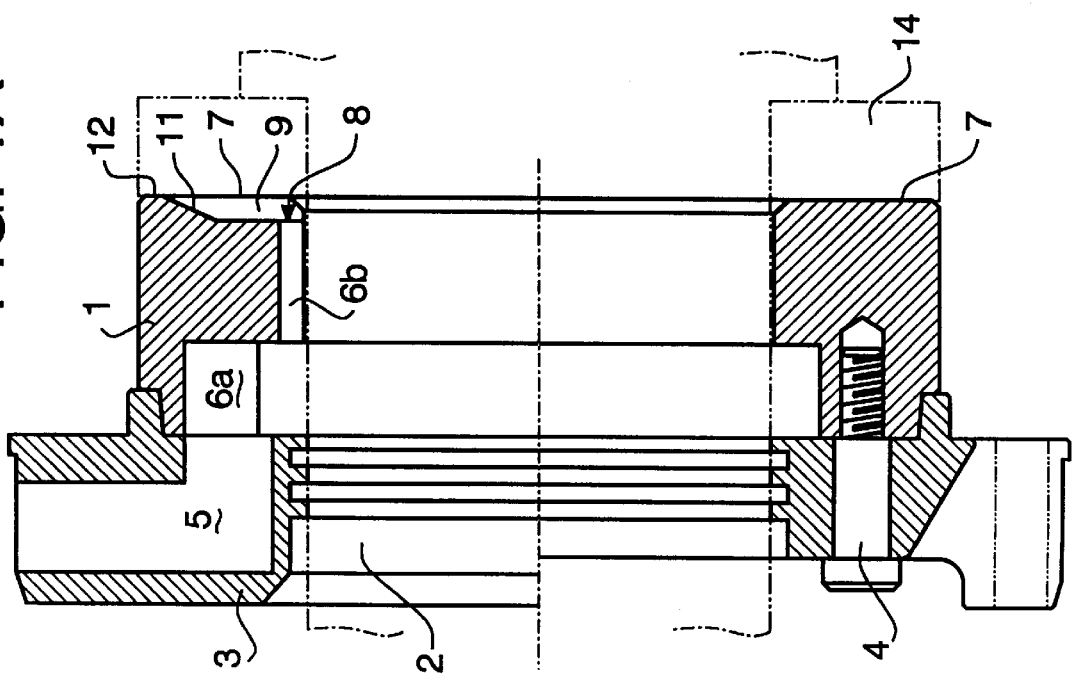

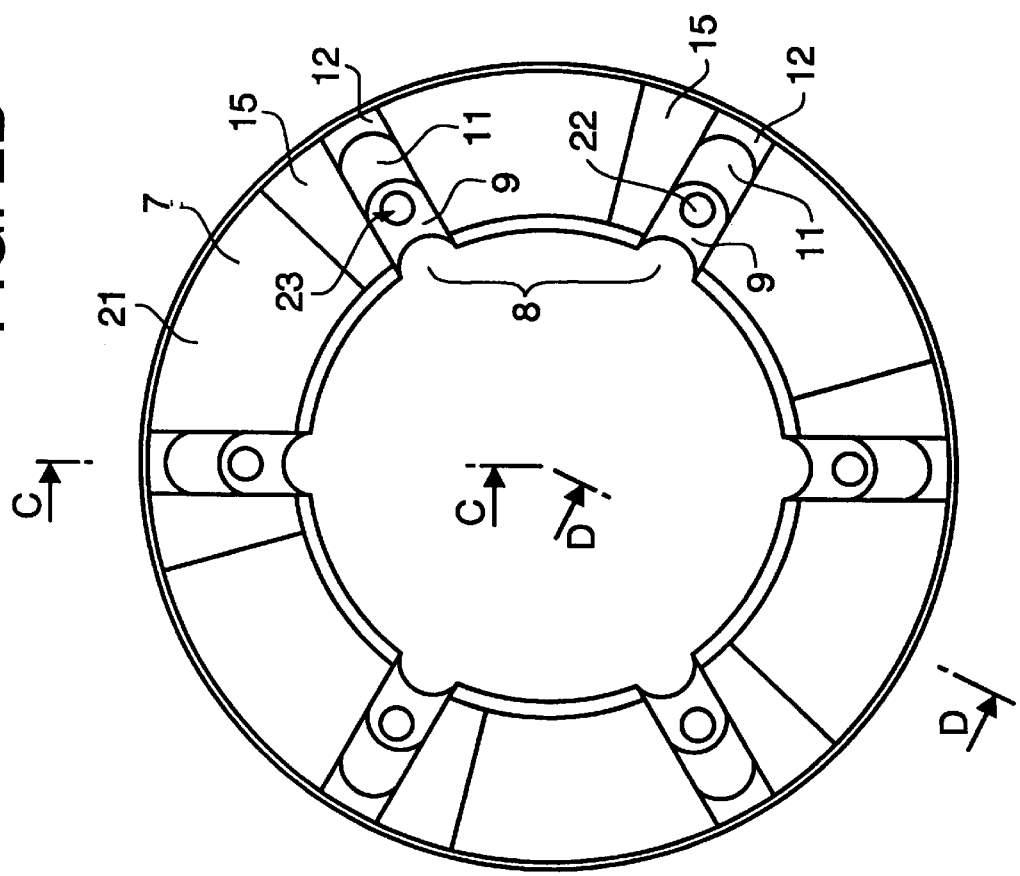
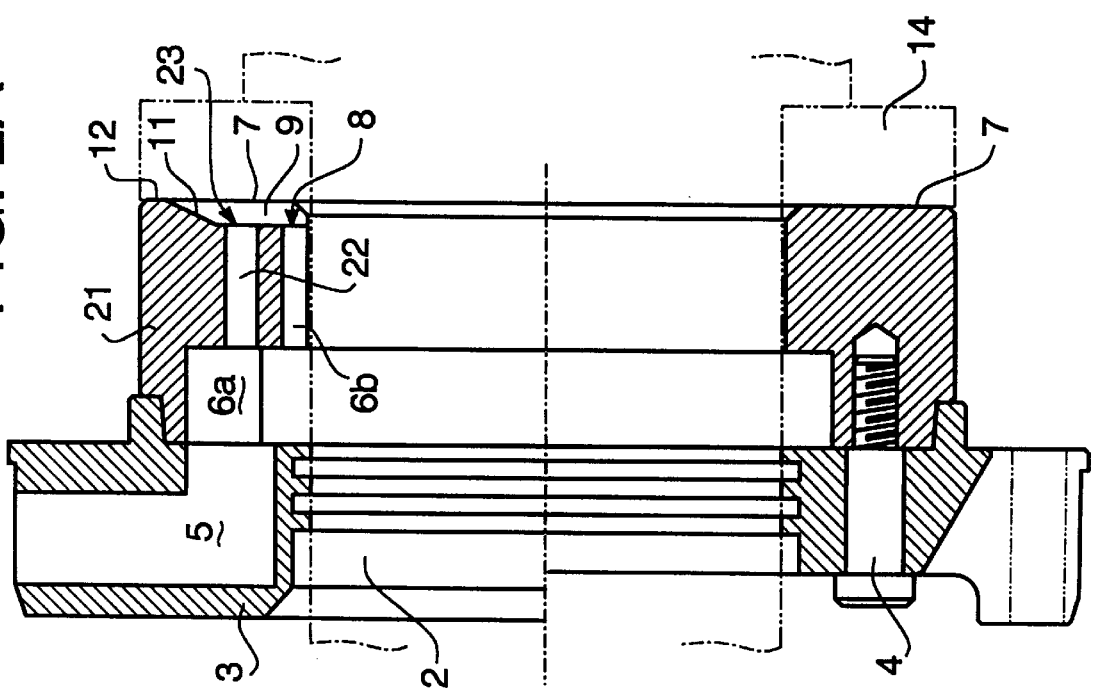

SUPERCHARGER THRUST BEARING

BACKGROUND OF THE INVENTION

1. Field of the Invention

This invention concerns a supercharger thrust bearing such as is used in boats and ships.

2. Description of the Related Art

FIGS. 3A and 3B in the attached Drawings illustrate a conventional supercharger thrust bearing 51. FIG. 3A is a sectional view and FIG. 3B is a front view. As diagramed, the conventional thrust bearing 51 used in a supercharger is in contact with a thrust collar 53 attached to a turbine shaft 52, so that it receives the thrust forces to which the turbine shaft is subjected. The thrust collar 53 turns together with the turbine shaft 52, and lubricating oil is supplied to a pad surface 54 of the thrust bearing 51 to reduce the thrust resistance and prevent the temperature of the pad surface 54 from rising.

A thrust bearing support 55 holds the thrust bearing 51 stationary. A plurality of oil supply passageways 56 are formed in the thrust bearing support 55 for the purpose of supplying the lubricating oil. The oil passageways 56 extend generally radiantly, spaced from each other in a circumferential direction. Another plurality of oil supply passageways 57 are formed in the thrust bearing 51 such that they communicate with the oil supply passageways 56 at upstream ends thereof (left ends in the drawing) and open to the pad surface 54 at downstream ends thereof (right ends in the drawing) respectively. Oil supply grooves 59 are formed to extend radiantly from open ends 58 of the oil supply passageways 57. These oil supply grooves 59 have a certain groove depth, and extend as far as the vicinity of the periphery of the thrust bearing 51. At the outer radial ends in the thrust bearing 51, another grooves 61 are formed having a shallower depth than the oil supply grooves 59.

The lubricating oil that is supplied from the oil supply passageways 56 and 57 flows outward in the radial direction inside the oil supply grooves 59, and, by the turning of the thrust collar 53, flows to the pad surface 54. Then, the lubricating oil that flows over the pad surface 54 flows out to the outside through gaps 62 formed between the shallow grooves 61 and the thrust collar 53. In this manner, the cool lubricating oil (new oil) is expected to be supplied over the entire pad surface 54. The lubrication oil is caused to move in the circumferential direction on the pad surface 54 upon rotations of the thrust collar 53 (or the turbine shaft 52) as indicated by the arrows X).

When the thrust bearing 51 described above has been used in automobile turbochargers, it has been possible to supply lubricating oil effectively to the pad surface 54.

In superchargers used in boats, ships and the like, however, which are operated under a high pressure ratio, the turning speed of a rotating shaft is high, so that the circumferential speed at the periphery of the thrust bearing is very high. As a result, a problem arises in that the new oil is not supplied adequately to the pad surface 54.

More specifically, at a high circumferential speed, the lubricating oil heated on one pad surface 54 rides over the cool lubricating oil (new oil) inside the adjacent oil supply groove 59 and penetrates to the next pad surface 54. Consequently, the temperature of the pad surface 54 readily rises.

SUMMARY OF THE INVENTION

An object of the present invention is to resolve the problems associated with the prior art discussed in the foregoing.

To this end, the present invention provides a supercharger thrust bearing which causes the lubricating oil inside the radial grooves of the thrust bearing to circulate more efficiently, thereby lowering the oil temperature inside the radial grooves, and, in turn, enhancing the pad surface cooling efficiency.

According to one aspect of the present invention, a super-charger thrust bearing for use in a machine rotatable particularly at a high speed includes a bearing body with a pad surface, oil supply passageways extending through the bearing main body to the pad surface, radial grooves formed in the pad surface that extend radially outward from downstream ends of the oil supply passageways, and gradients formed at the outward radial ends of the radial grooves such that the groove depth sequentially diminishes as the outside in the radial direction is approached. The machine rotatable at a high speed is, for example, a boat or a ship. It should be noted that the thrust bearing of the invention is also applicable to a machine which rotates at an intermediate or low speed. The lubricating oil inside the radial grooves is forced out by the gradients of the radial grooves since the gradients has a decreasing depth near their radial ends. In other words, the gradients serve as throttles. Accordingly, the lubrication oil is sufficiently discharged from the radial grooves even when a rotating shaft of a supercharger turns at a high speed. The lubrication oil (new and cold oil) discharged from the radial grooves prevents the lubrication oil, which is moving in the circumferential direction on the pad surface and is heated on the pad surface upon rotations of the rotating shaft of the supercharger, from flowing over the radial grooves (or from jumping over the new oil in the radial grooves) since the discharged lubrication oil makes a dam. The heated oil moving in the circumferential direction on the pad surface is turned in the radially outward direction at the radial grooves by the new cold oil overflowing from the radial grooves. The heated oil is pushed out from the pad surface and the new cold oil is forced on the pad surface and cools the pad surface. Therefore, it is possible to promote the lubricating oil circulation and the pad surface cooling.

It is also permissible to form additional oil supply passageways in the thrust bearing body for supplying a lubrication oil in the vicinity of the gradients of the radial grooves. With these additional oil passageways, the new cool oil is also supplied near the gradients of the oil supply grooves. Therefore, the lubrication oil is fed over the entirety of the oil supply grooves, making it possible to further enhance pad surface cooling efficiency.

BRIEF DESCRIPTION OF THE DRAWINGS

FIG. 1A illustrates a cross-sectional view of a supercharger thrust bearing concerning a first embodiment of the present invention;

FIG. 1B illustrates a front view of the supercharger thrust bearing diagramed in FIG. 1A;

FIG. 2A illustrates a cross-sectional view of a supercharger thrust bearing concerning a second embodiment of the present invention;

FIG. 2B illustrates a front view of the supercharger thrust bearing shown in FIG. 2A;

DETAILED DESCRIPTION OF THE INVENTION

Figure 3B:
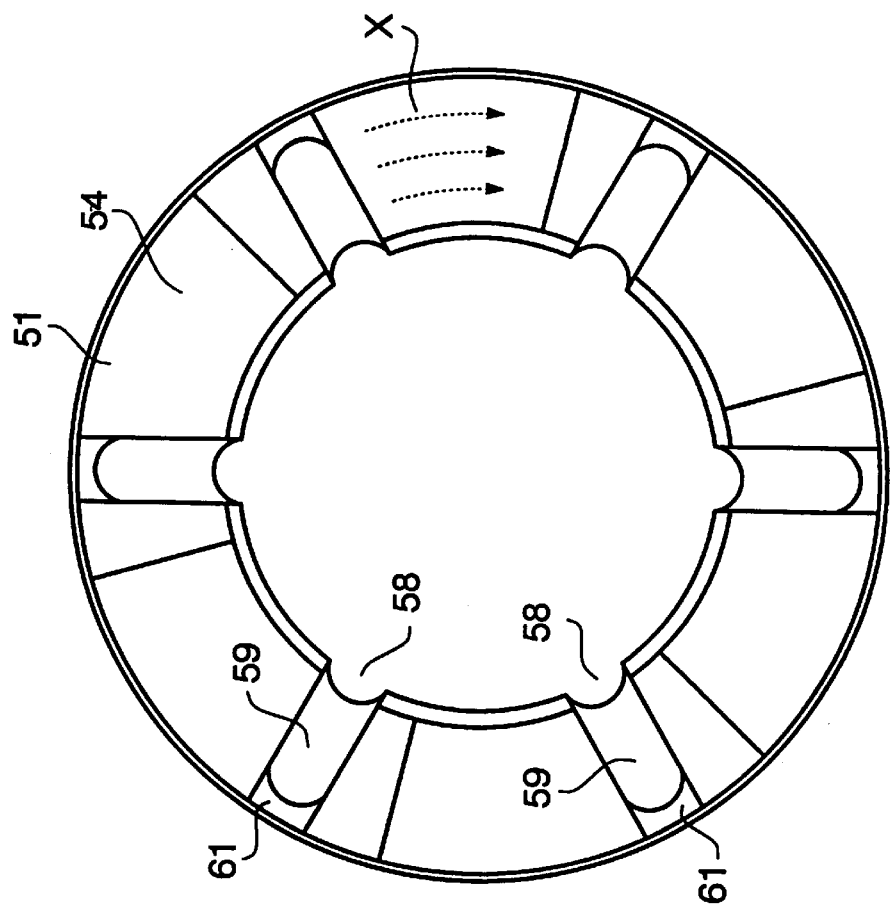
FIG. 3B illustrates a front view of the supercharger thrust bearing shown in FIG. 3A.
Figure 3A:
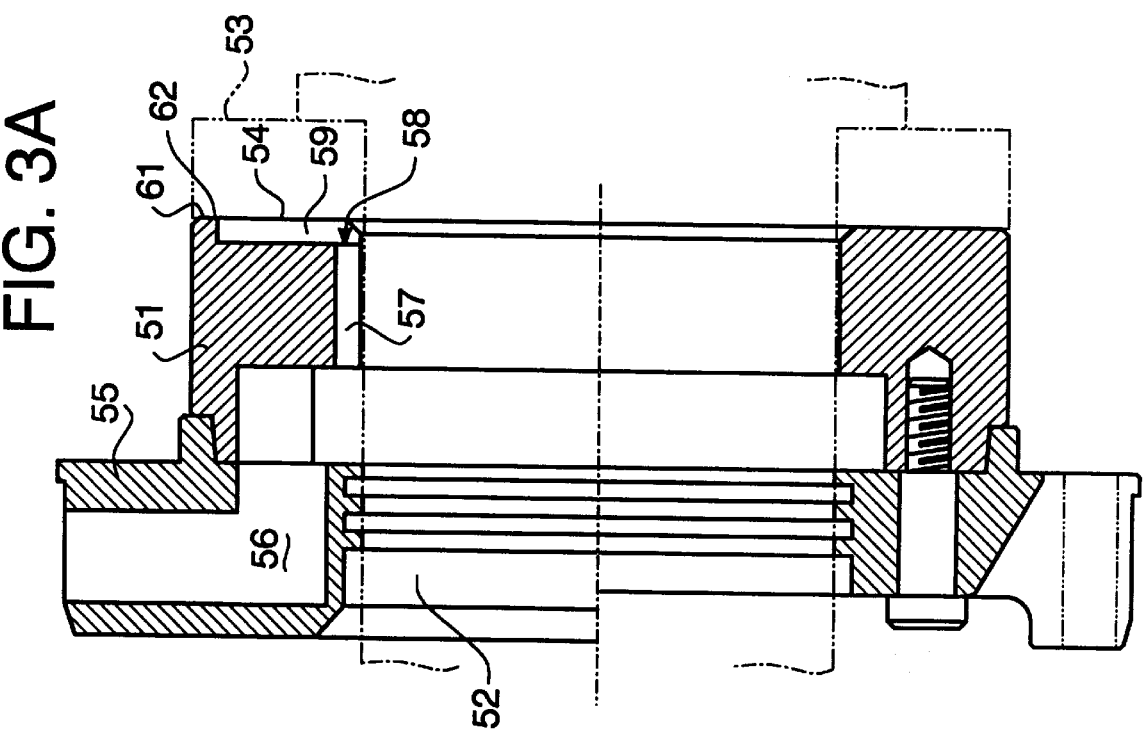
FIG. 3A illustrates a cross-sectional view of a conventional supercharger thrust bearing.

Embodiments of the present invention will now be described, making reference to FIGS. 1A, 1B, 2A and 2B of the attached drawings.

A first embodiment of the supercharger thrust bearing to which the present invention pertains is described first.

Referring to FIG. 1A, illustrated is a cross-sectional view of the supercharger thrust bearing 1 according to the present invention. The upper half of this drawing shows the cross-section taken along the line A—A of FIG. 1B and the lower half is the cross-section taken along the line B—B of FIG. 1B.

The thrust bearing 1 is formed in a ring shape about a turbine shaft 2, and is secured by a plurality of bolts 4 to a thrust bearing support 3 formed also in a ring shape about the turbine shaft 2. A compressor wheel (not shown) is provided on the left (in this drawing) of the turbine shaft 2.

In the thrust bearing support 3, are formed a plurality of oil supply passageways 5 generally extending radiantly toward the turbine shaft 2 for supplying lubricating oil to the thrust bearing 1. (FIG. 1A only illustrates one passageway 5.) A plurality of oil supply passageways 6a are formed in the back side of the thrust bearing 1 (opposite the pad surface 7) so as to communicate with the downstream ends of the oil supply passageways 5 respectively. These oil supply passageways 6a are formed by partially cutting away, in the radial direction, the center opening of the thrust bearing 1, and are formed so that they communicate with oil supply passageways 6b that open at the pad surface 7.

In the pad surface 7 are formed oil supply grooves 9 that extend radially outward from the downstream end openings 8 of the oil supply passageways 6b. These oil supply grooves 9 are formed with a prescribed groove depth, and at the outer ends thereof in the radial direction are formed gradients 11 such that the groove depths sequentially diminish as the outside in the radial direction is approached. These gradients 11 are formed so that they form circular arcs as seen from the front (see FIG. 1B), with an angle of inclination of from approximately 30 degrees to 45 degrees, for example, so as to balance the flow volume of and pressure loss in the lubricating oil inside the oil supply grooves 9. On the outside of the oil supply grooves 9 in the radial direction are formed shallow grooves 12 so as to communicate with the gradients 11.

In the configuration of this embodiment, the oil supply grooves 9 are formed at six places at equal angles around the circumference of the pad surface 7 as illustrated in FIG. 1B, but the number thereof is not to be so limited, and any number may be formed, as suitable and desirable.

The pad surface 7 on the right side of each radial groove 9 is a tapered surface, and a bearing land 15 is formed on the right side of the tapered surface. The next radial groove 9 is formed on the right side of the land area 15. The lubrication oil is caused to flow clockwise on the pad surface 7 upon rotations of the turbine shaft 2 or the thrust collar 14 as indicated by the arrows Y in FIG. 1B. The thrust collar 14 rotates together with the turbine shaft 2 since it is secured to the turbine shaft 2. The tapered surface has an increasing height in the rightward direction of the drawing. The land area 15 has a constant height. The land area 15 is the highest area of the pad surface 7.

When this configuration is implemented, the lubricating oil passes through the oil supply passageways 5, 6a, and 6b, and flows from the openings 8 into the oil supply grooves 9. New lubricating oil (new oil) is supplied continually, so that the lubricating oil is forced radially toward the outside (including the pad surface) in the oil supply grooves 9, either flowing through the shallow grooves 12, or being pulled onto the pad surface 7 by the thrust collar 14 that turns together with the turbine shaft 2.

The lubricating oil flowing through the shallow grooves 12 is smoothly guided to the outside (including the pad surface) along the gradients 11. Thus, it is possible to efficiently circulate the lubricating oil inside the oil supply grooves 9 without creating retention. As a result, the oil temperature in the oil supply grooves 9 can be lowered. At the same time, the oil temperature of the lubricating oil pulled onto the pad surface 7 is also lowered, and temperature elevation of the pad surface 7 is prevented.

A second embodiment of the supercharger thrust bearing according to the present invention is now described with reference to FIGS. 2A and 2B. It should be noted that like numerals are assigned to like parts and components in FIGS. 1A, 1B, 2A and 2B and description of such components are generally omitted. The upper half of FIG. 2A illustrates a cross-sectional view taken along the line C—C of FIG. 2B and the lower half illustrates the cross-section taken along the line D—D of FIG. 2B.

Referring to FIG. 2A, a thrust bearing 21 of this embodiment is characterized by the construction that additional oil supply passageways 22 are formed in the thrust bearing 21 to open in the vicinity of the gradients 11 of the oil supply grooves 9. Specifically, in addition to the oil supply passageways 6b extending along the turbine shaft 2 as in the first embodiment, the second oil supply passageways 22 having a circular cross-section also extend along the turbine shaft 2 next to the first oil passageways 6b from the passages 6a to the radial grooves 9. A downstream end opening 23 of each oil supply passageway 22 opens in the associated radial groove 9 at a position radially inward of the gradient 11 and outward of the downstream end opening 8 of the passageway 6b. Therefore, the new oil from a suitable source (not shown) is supplied to the relatively radially outward areas of the oil supply grooves 9 (or to the vicinity of the gradients 11). It should be noted that the cross-sectional shape of the oil passageways 22 is not limited to circular, but may be polygonal instead.

Other than this, the configuration of this second embodiment is the same as that of the first embodiment.

When the configuration shown in FIGS. 2A and 2B is implemented, the new oil is supplied both inwardly in the radial direction in the oil supply grooves 9, and in the vicinity of the gradients 11. Thus, it is possible to increase the oil supply volume, and also to circulate the lubricating oil even more efficiently. Furthermore, because the oil is supplied both inwardly in the radial direction in the oil supply grooves 9 and in the vicinity of the gradients 11, cooled new oil is supplied not only toward the inside of the pad surface 7, but also in the center thereof. Thus new oil, at low temperature, is supplied over the entire pad surface 7, so that pad surface cooling efficiency can be even further enhanced.

As understood from the above description, the lubricating oil can be circulated efficiently inside the oil supply grooves, and pad surface cooling efficiency can be enhanced. Thus the present invention exhibits outstanding benefits.

What is claimed is:

1. A supercharger thrust bearing comprising:

a body with a pad surface;

at least one first oil passageway extending to the pad surface through the body;

at least one groove communicating with the at least one first oil passageway and extending radially outward in the pad surface for supplying an oil to the pad surface from the first oil passageway; and a gradient formed at an outward radial end of each of the at least one groove such that groove depth of the at least one groove sequentially diminishes as outside in radial direction is approached.

2. The supercharger thrust bearing according to claim 1 further including at least one second oil supply passageway extending to the pad surface through the body for also supplying an oil into the at least one groove.

3. The supercharger thrust bearing according to claim 2, wherein the at least one second oil supply passageway opens in the vicinity of the gradient in the groove.

4. The supercharger thrust bearing according to claim 2, wherein the gradient has an inclination of 30–45 degrees.

5. The supercharger thrust bearing according to claim 3, wherein the gradient has an inclination of 30–45 degrees.

6. The supercharger thrust bearing according to claim 2, wherein the first oil passageway extends near a rotating shaft on which the thrust bearing is mounted and the second oil passageway extends next to the first oil passageway.

7. The supercharger thrust bearing according to claim 6, wherein the pad surface has a tapered surface extending from the groove in a downstream direction of flow of an oil on the pad surface upon rotations of a rotatable shaft of the supercharger, and the tapered surface has an increasing height in the direction of flow of the oil on the pad surface.

8. The supercharger thrust bearing according to claim 7, wherein the pad surface further has a land area of constant height on the downstream side of the tapered surface.

9. The supercharger thrust bearing according to claim 1, wherein the gradient has an inclination of 30–45 degrees.

10. The supercharger thrust bearing according to claim 1, wherein the pad surface has a tapered surface extending from the groove in a downstream direction of flow of an oil on the pad surface upon rotations of a rotatable shaft of the supercharger, and the tapered surface has an increasing height in the direction of flow of the oil on the pad surface.

11. The supercharger thrust bearing according to claim 10, wherein the pad surface further has a land area of constant height on the downstream side of the tapered surface.

12. The supercharger thrust bearing according to claim 11, wherein each groove is formed on the downstream side of the land area if a plurality of grooves are formed in the pad surface.

13. A thrust bearing for use in a rotating element of a supercharger, comprising:

a body with a surface, the surface being exposed to a thrust force from a rotating element of a supercharger;

at least one first oil passageway extending to the surface through the body for conveyance of an oil from an oil source;

at least one radial groove communicating with the first oil passageway and extending radially outward in the surface for supplying an oil to the surface from an oil source through the first oil passage; and oil push-out means for causing an oil in the groove near a radial end of the groove to be pushed out from the groove so that an oil flowing on the surface is dammed and forced out of the surface by an oil pushed out from the groove and an oil pushed out from the groove flows on the surface.

14. The thrust bearing according to claim 13 further including at least one second oil supply passageway extending to the surface through the body for also supplying an oil into the radial groove.

15. The thrust bearing according to claim 14, wherein the second oil supply passageway opens in the vicinity of the oil push-out means.

16. The thrust bearing according to claim 13, wherein the surface has a tapered surface extending from the radial groove in a downstream direction of flow of an oil on the surface upon rotations of a rotatable element of a supercharger, and the tapered surface has an increasing height in the direction of flow of the oil on the surface.

17. The thrust bearing according to claim 16, wherein the surface further has a land area of constant height on the downstream side of the tapered surface.

18. The thrust bearing according to claim 17, wherein each radial groove is formed on the downstream side of the land area if a plurality of radial grooves are formed in the surface.

19. The thrust bearing according to claim 16, wherein the push-out means includes a gradient with an inclination of 30–45 degrees.

20. The thrust bearing according to claim 13, wherein the push-out means includes a gradient with an inclination of 30–45 degrees.

* * * * *